United States Patent
Nooren

(10) Patent No.: US 9,834,263 B1
(45) Date of Patent: Dec. 5, 2017

(54) EXPANDING SELF PROPELLED MODULAR TRANSPORT TRAILERS

(71) Applicant: Mammoet USA South, Inc., Rosharon, TX (US)

(72) Inventor: Piet Nooren, Algleton, TX (US)

(73) Assignee: Mammoet USA South, Inc., Rosharon, TX (US)

(*) Notice: Subject to any disclaimer, the term of this patent is extended or adjusted under 35 U.S.C. 154(b) by 0 days.

(21) Appl. No.: 15/158,930

(22) Filed: May 19, 2016

(51) Int. Cl.
| | |
|---|---|
| *B62D 49/06* | (2006.01) |
| *B62D 63/06* | (2006.01) |
| *B62D 59/04* | (2006.01) |
| *B62D 21/14* | (2006.01) |
| *B62D 61/10* | (2006.01) |

(52) U.S. Cl.
CPC ......... *B62D 49/0678* (2013.01); *B62D 21/14* (2013.01); *B62D 59/04* (2013.01); *B62D 63/068* (2013.01); *B62D 61/10* (2013.01)

(58) Field of Classification Search
CPC .... B62D 21/14; B62D 49/0678; B62D 61/10; B62D 63/061
See application file for complete search history.

(56) References Cited

U.S. PATENT DOCUMENTS

| | | | | | |
|---|---|---|---|---|---|
| 3,698,734 | A | * | 10/1972 | Drake | B62D 21/14 280/656 |
| 9,522,707 | B2 | * | 12/2016 | Kern | B60G 7/02 |
| 2015/0084359 | A1 | * | 3/2015 | Frost | B62D 21/14 296/26.15 |
| 2015/0284041 | A1 | | 10/2015 | Kern | |
| 2015/0343935 | A1 | | 12/2015 | Fox | |
| 2017/0050692 | A1 | * | 2/2017 | Haefele | B62D 63/025 |
| 2017/0129539 | A1 | * | 5/2017 | Kramer | B62D 21/14 |

FOREIGN PATENT DOCUMENTS

| | | |
|---|---|---|
| CA | 2951742 A1 | 12/2015 |
| DE | 20 2014 005 055 U1 | 11/2015 |
| FR | 1020274 | 2/1953 |

OTHER PUBLICATIONS

Cranes & Access, "Heavy Going" Jun. 2015. pp. 45-49.

* cited by examiner

*Primary Examiner* — Kevin Hurley
(74) *Attorney, Agent, or Firm* — Blank Rome, LLP

(57) ABSTRACT

Provided herein is a split variable extension width self-propelled motorized transporter (SPMT) vehicle including a widening adaptor that allows for variable spacing of split SPMT trailers thus increasing the width of the loading platform without the need to add more SPMTs and Power Pack Units (PPUs).

18 Claims, 11 Drawing Sheets

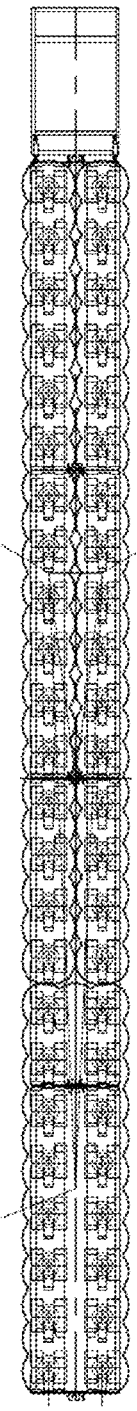
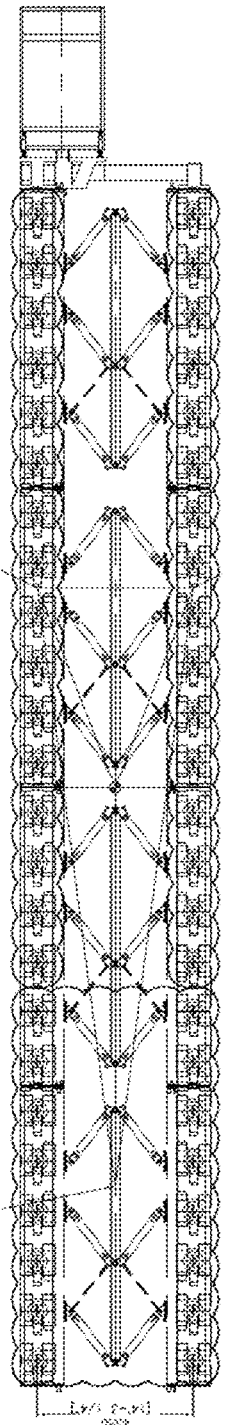
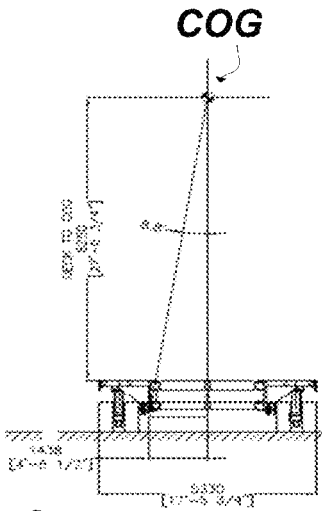
*Figure 10A PRIOR ART*
*Figure 10B PRIOR ART*
*Figure 10C*
*Figure 10D*

US 9,834,263 B1

EXPANDING SELF PROPELLED MODULAR TRANSPORT TRAILERS

FIELD OF THE INVENTION

This invention relates generally to apparatus and methods for heavy-load transport trailers, especially self-propelled modular transport ("SPMT") trailers.

BACKGROUND OF THE INVENTION

Without limiting the scope of the invention, its background is described in connection with existing self-propelled modular transporters ("SPMT") for transport of very heavy and large loads weighing tens to hundreds of tons. SPMTs are a combination of a trailer unit and a power pack unit ("PPU"). In simplest form, the trailer unit includes two longitudinal rows of paired wheels such that viewed from the top there would be 4 longitudinal lines of wheels, two on one side and two on the other side. Each wheel pair has its own axle. Viewed from the side, there will typically there will be 3, 4, 5, 6 or 8 axle assemblies visible representing half of each cross-wise matching set for a total of (respectively) 12, 16, 20, 24 or 32 wheels per module depending on the number of axle assemblies. Each axle of a given wheel pair can swivel independently of the other wheel pairs and some or all of the wheels are individually controlled and hydraulically propelled. Each wheel assembly communicates with a controller that commands the wheel assembly to turn, brake or rotate. Electronic control of the wheel assemblies allows for synchronous steering with unitary control of the wheel assemblies. The wheel assemblies can also be raised and lowered hydraulically to adjust the vertical height of the deck and can move up and down independently to allow movement over uneven surfaces without up and down movement of the upper load carrying deck.

Typically, SPMTs are constructed with a single deck having two longitudinal lines of wheel pairs mounted underneath. Such an arrangement would be considered a double axle trailer or one line. Alternatively, a given longitudinal string of single axle wheel pairs may have its own deck such that in use two long single axle wheel-pair trailers would be bolted together to form a unitary deck. Because the trailers are modular, they are strung together end-to-end to increase the overall length of the combined modules.

Typically, when widthwise extension of the trailer platform is required for very wide loads, a series of trailers will be run together side-by-side as shown in FIG. 1B. Flexibility of the width of combined trailers has been obtained with combinations such as for example a triple axle arrangement with a double axle trailer combined with a single axle trailer to form three longitudinal lines of wheel pair assemblies with 6 wheels across in three pairs.

However, such a parallel arrangement consumes a large number of trailers. More recently, split trailers have been developed in which two single axle wheel-pair trailers are separated by telescopic bars that connect the trailers. Problematically, the telescopic bars prevent the two trailers from coming close together and/or project from the sides of the trailers.

Provided herein are novel extension mechanisms to provide variable extension widths of SPMT trailers while providing the required stability of a unitary structure.

BRIEF SUMMARY OF THE INVENTION

Disclosed herein are folding widening assemblies that connect between two longitudinal multi-axle wheel frames. In one embodiment, a pair of longitudinal multi-axle wheel frames are connected by at least three widening assemblies, each of the widening assemblies including a pair of hinged opposing folding arms connecting the longitudinal multi-axle wheel frames. At least one of the widening assemblies will be a motive assembly that by folding or opening acts to diminish or extend the distance between the longitudinal multi-axle wheel frames.

In one embodiment a split variable extension width self-propelled motorized transporter (SPMT) vehicle is provided that includes a pair of matching longitudinal chassis, each chassis including a deck supported by a plurality of wheel pair assemblies, and at least three widening assemblies mounted between the two chassis, wherein each of the widening assemblies comprises a pair of hinged opposing folding arms, each of the pair of folding arms pivotably connecting the two matching longitudinal chassis through a center hinge that is affixed to a central aligner that runs longitudinally between, and equidistant from, each of the longitudinal chassis. In certain embodiments at least two of the widening assemblies operate as a passive pair, having arms that move in the same direction and central hinges that are affixed in a set location on the central aligner, and the third widening assembly is a sliding assembly having widening arms that move in an opposite direction to the passive pair and having its center hinge affixed in a slidable position on the central aligner such that movement of the two longitudinal chassis toward or away from each other moves the hinge of the sliding widening assembly relative to the fixed positions of the central hinges of the passive pair and assists in stable widening or narrowing of a distance between the longitudinal chassis.

In certain embodiments, the center hinge of the sliding assembly is affixed on a runner that slides along the central aligner. Desired positions of the runner on the central aligner may be set by a pin or bolt that locks the runner in a fixed location on the central aligner. The central aligner can be a tube, rod or beam and the runner will be configured to fit around and slide over the central aligner.

In certain embodiments, the central aligner is a hydraulic cylinder and the center hinges of the passive pair of widening assemblies are affixed in a set location to a housing of the hydraulic cylinder and the center hinge of the sliding assembly is affixed to a piston rod of the hydraulic cylinder such that movement of the piston rod moves the hinge of the sliding widening assembly relative to the fixed positions of the central hinges of the passive pair. Stabilizing lines such as chains or cables may be affixed between at the passive arm chassis connections of at least one widening assembly and a central hinge of an adjacent widening assembly. In certain embodiments the central hydraulic cylinder is powered by a Power Pack Unit that also provides hydraulic power to the wheel assemblies.

In other embodiments, additional passive widening assembly are provides to enable further length of the trailers and further stability. In some embodiments, a dual hydraulic cylinder is provided having a first and second piston, the first and second pistons adapted to move in opposite directions relative to each other and a fourth sliding widening assembly positioned behind the pair of passive widening assemblies and having a central hinge affixed to the second piston and its widening arms moving in the same direction as the arms of the passive pair.

In certain embodiments, the arms of the widening assemblies include pairs of hinged opposing folding arms that include a set of two hinged top arm pairs and two hinged bottom arm pairs pivotably attached to and sandwiching the central aligner or hydraulic cylinder.

In other embodiments, a split variable extension width self-propelled motorized transporter (SPMT) vehicle is provided that includes a pair of matching longitudinal chassis, each chassis including a deck supported by a plurality of wheel pair assemblies and at least three widening assemblies mounted between the two chassis, wherein each of the widening assemblies comprises a pair of hinged opposing folding arms, each of the pair of folding arms pivotably connecting the two matching longitudinal chassis through a center hinge that is affixed to a central aligner that runs longitudinally between, and equidistant from, each of the longitudinal chassis.

BRIEF DESCRIPTION OF THE DRAWINGS

For a more complete understanding of the present invention, including features and advantages, reference is now made to the detailed description of the invention along with the accompanying figures:

In FIG. 3A the split SPMT is in a collapsed position while in FIG. 3B the split SPMT is in an expanded position.

FIG. 9A depicts an embodiment having three hydraulic systems and what could be termed a three hydraulic suspension.

FIG. 10A demonstrates a prior art multiple module SPMT while FIG. 10B shows a calculated angle to a center of gravity (COG) for the trailer of FIG. 10A with an assumed weight and COG height. FIG. 10C demonstrates a multiple module split SPMT according to one embodiment while FIG. 10D shows a calculated angle to a center of gravity (COG) for the trailer of FIG. 10C using the same criteria as FIG. 10B.

DETAILED DESCRIPTION OF THE INVENTION

While the making and using of various embodiments of the present invention are discussed in detail below, it should be appreciated that the present invention provides many applicable inventive concepts that may be employed in a wide variety of specific contexts. The specific embodiment discussed herein are merely illustrative of specific ways to make and use the invention and do not delimit the scope of the invention.

In heavy transport, high and wide loads with a high center-of-gravity—such as large pipe rack modules—are typically transported on multiple rows of SPMTs. Connecting more SPMT trailer units side-by-side creates a wider loading platform ensuring stability of the load during transport and enhancing safety. However, in many cases the increased load capacity that comes with the additional trailer units is not required. What is instead required is a wider bed. Provided herein is a SPMT including widening assemblies that allow for variable spacing of split SPMT trailers—increasing the width of the loading platform without the need to add more SPMTs and Power Pack Units (PPUs). This allows for safer and more cost-effective transport of specific loads and reduces the carbon footprint of those transports that would otherwise need more SPMTs and PPUs.

In one embodiment provided herein is split SPMT is described that includes at least three widening assemblies, each assembly comprising a pair of articulated arms that are outwardly attached to the inner walls of two SPMT single chassis and are centrally connected to a central aligner running centrally and longitudinally between the two chassis. Through the use of at least three widening assemblies, the two longitudinal chassis are kept in parallel. In one embodiment the central aligner is a hydraulic cylinder. In such embodiments, the hydraulic cylinder helps provide a motive force that works with the motorized wheel assemblies of the chassis to assist in moving the longitudinal chassis together and apart. In other embodiments the central aligner is passive and for the motive widening assembly, its articulated arms are centrally connected to a runner that slides over the central aligner. In such embodiments, motorized wheel assemblies of the chassis drive the chassis together or apart. In either event, the central aligner, whether passive or hydraulic keeps the articulated arms aligned as they move to either increase or decrease the distance between the trailer chassis.

In certain embodiments, the split SPMT with widening adaptor has a minimum width of 3 meters and a maximum width of 6.4 meters—meaning one row of split SPMTs can replace two rows of conventional SPMTs.

In certain embodiments, the widening assemblies are removable for shipment. If removed and placed on top of the two reconnected SPMT-halves, the width is reduced to 2.43 meters making it possible to fit the split SPMT into a standard flat rack shipping container for efficient shipping.

Figure 1A:
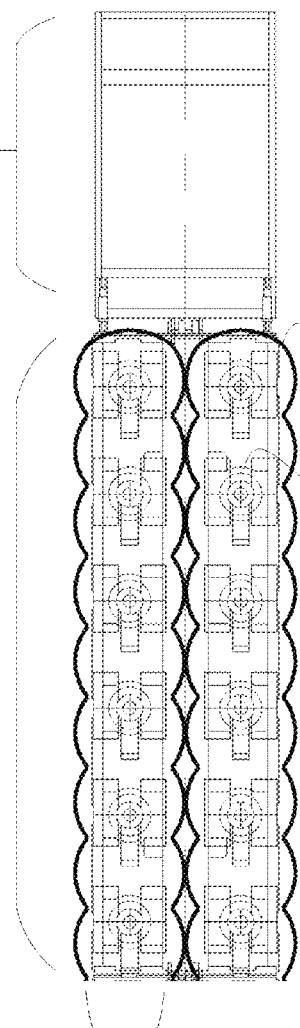
FIG. 1A depicts a typical prior art SPMT single module, which includes a power pack unit ("PPU") and a trailer unit having two longitudinal columns, each column having a plurality of single axle wheelset assemblies.
Figure 1B:
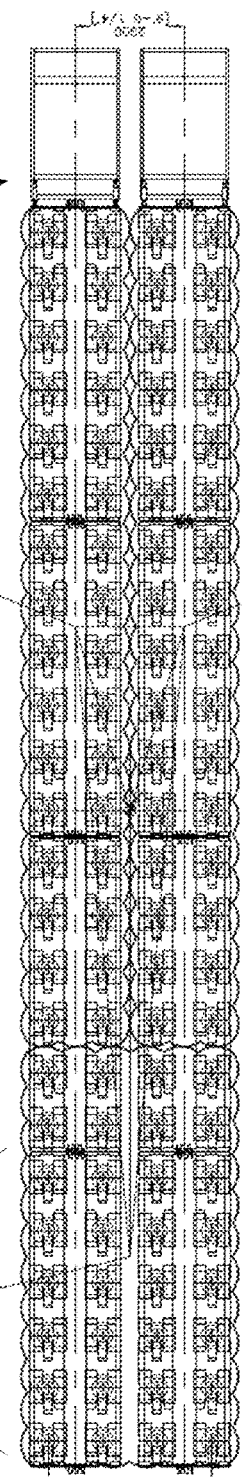
FIG. 1B depicts a typical prior art SPMT having eight trailer assemblies bolted together and operated by two PPU.

FIG. 1A depicts a typical prior art SPMT single module 10, which includes a power pack unit ("PPU") 12 and a trailer unit 14 having two longitudinal columns, each column having a plurality of single axle wheelset assemblies 18. The dark loops 16 represent coupled hydraulics for this embodiment bearing in mind that this may be different for every combination. Each pair of wheels is fixed to its own axle forming a wheelset 18 that can rotate through certain degrees of rotation and then turn around and cover other degrees of rotation going "backwards." Each wheelset can be driven in any direction. Typically the wheelsets will be affixed to an upper rigid deck (not shown). Currently when SPMTs are utilized for wide loads one option is to double the number of trailer assemblies widthwise as shown in FIG. 1B. In the example of FIG. 1B, eight trailer assemblies 14 are bolted together and are operated by two PPU 12. Problematically in this implementation, the entire unit is extremely heavy and the overall width is not negotiable. It is either a single wide or is double the width of the single wide.

Provided herein is a solution that enables a variable width split trailer SPMT that has the required dimensional stability to keep the two single trailers parallel to each other at all times. As depicted in one embodiment in FIG. 2B, two single axle trailers 20 (here termed as "single axle" because there is one widthwise axle per trailer chassis although in the depicted embodiment there are six single axles along a longitudinal aspect of each single trailer) are separated by at least three widening assemblies 22, 24 and 26 that each include an "elbow" hinged articulated arm set. Each arm set will have a right arm and a left arm of the same length connected by a central pinned hinge. Each left arm of each hinged arm set will be connected on an outer end (that is—distal to the central hinge) to an inner aspect of a left or port trailer chassis by a pivot bracket. Conversely, each right arm of each hinged arm set will be connected on an outer end to an inner aspect of a right or starboard trailer chassis by a pivot bracket. Thus, in the depicted embodiment, hinged left arm 26a is fixed on an innermost end to central hydraulic cylinder housing 30 via a central pinned hinge 34 that also connects to innermost end of hinged right arm 26b. Hinged left arm 26a is connected on an outermost aspect to left or port chassis 48 via a pivot bracket 28. Likewise, hinged right arm 26b is connected on an outermost aspect to right or starboard chassis 46 via a pivot bracket 28.

Similarly, hinged arm set 24 is affixed to central hydraulic cylinder housing 30 via a central pinned hinge 36. In the depicted embodiment, arms 26a,b and 24a,b are passive and affixed to the central hydraulic cylinder housing at a fixed longitudinal position relative to each other. In the depicted embodiment of FIGS. 2A and B, hinged arm set 22a,b is the motive widening assembly and its arms are fixed on an outer end of central hydraulic cylinder piston rod 38 via pinned hinge 32. Whether passive or motive, the outer ends of each arm set are connected to their respective chassis via pivot brackets 28.

Figure 2A:
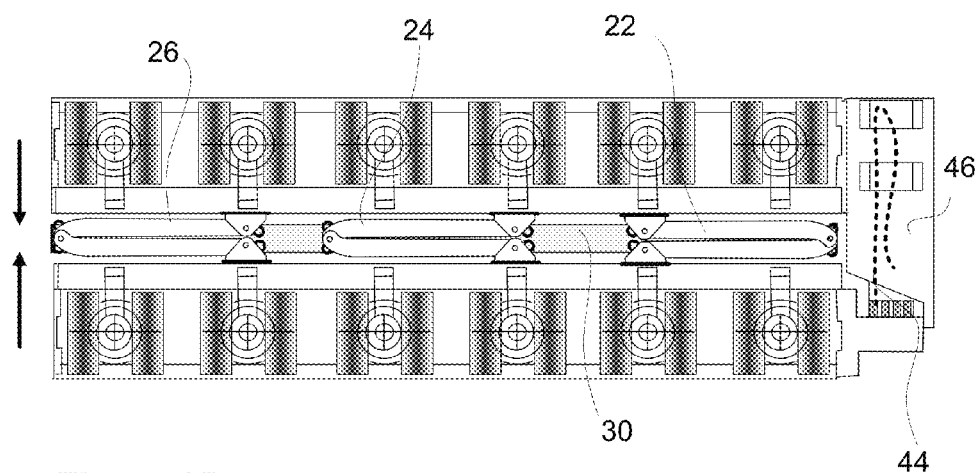
FIG. 2A depicts one embodiment of a split SPMT having three hinged widening assemblies per module in a closed position.
Figure 2B:
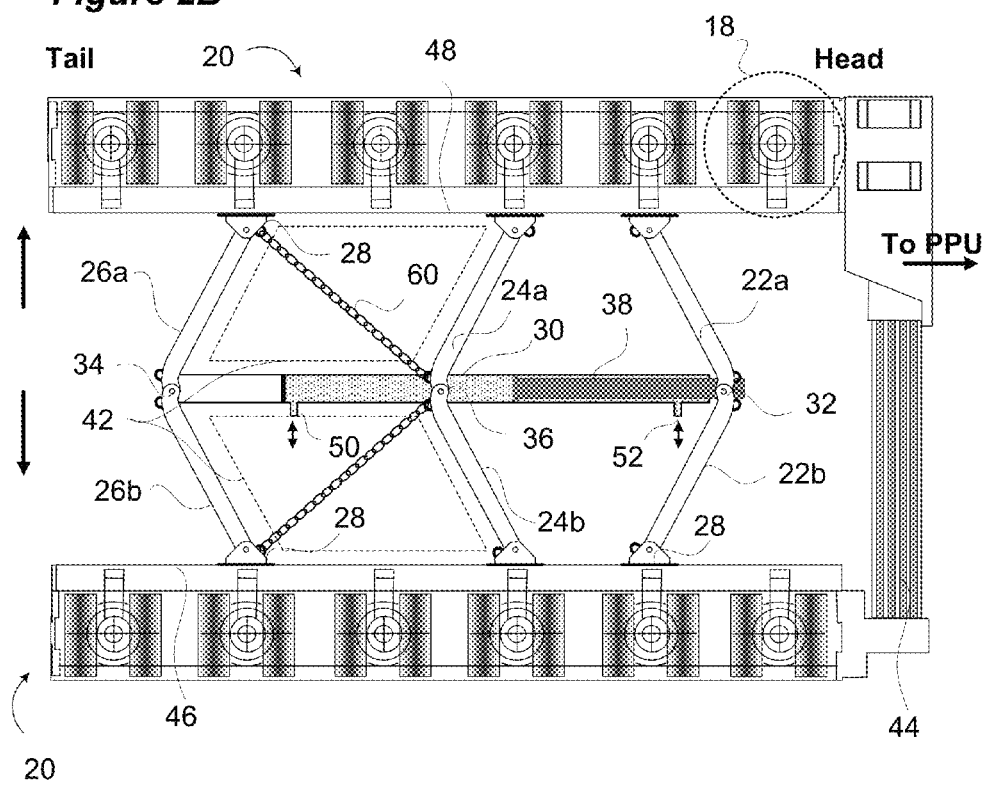
FIG. 2B depicts the split SPMT of FIG. 2A in an expanded position.

While FIG. 2B depicts the two chassis 20 in a separated position, FIG. 2A depicts the two chassis 20 in their closest opposition with the plurality of widening assemblies (arm sets) 22, 24 and 26 folded against the central hydraulic cylinder 30. In the fully closed position, piston rod 38 of the hydraulic cylinder is fully extended. In a widening operation, each wheel assembly (one of which is shown within dashed circle 18) of both trailer chassis will be turned 90° outward respective to a forward position toward the PPU. The wheel assemblies can be driven apart and the arms would begin to unfold if hydraulic pressure was relieved from the hydraulic cylinder such that the piston rod could retract into the cylinder. However, in practice, in order to achieve full extension the motive force of the central hydraulic cylinder is employed because full extension is difficult to achieve in an unloaded trailer. In some cases, in the absence of weight on the trailer, the wheels may be unable to be sufficiently anchored by weight to achieve full extension but may spin on the ground surface. Thus, the motive power of the central hydraulic cylinder is utilized to achieve full extension. In an opening operation, hydraulic fluid is pumped into hydraulic port 52, which will act to push piston rod 38 inward through hydraulic cylinder housing 30. As piston rod 38 is pushed longitudinally inward, it will carry affixed hinge 32 inward.

Because the hinge 36 of the next pair of arms is fixed on the housing of the hydraulic cylinder, as piston rod 38 is pulled in, the two hinges 36 and 32 will be drawn longitudinally together thus causing their respective arms to extend. Because the next widening assembly, arm set 26, is in a fixed position nested behind the central widening assembly, arm set 24, on the central cylinder, with its arms parallel to the arms of the adjacent arm set 24, its arms will be passively extended at the same angle as those of set 24. At all times except when fully folded, the arms of the nested set of hinged arms when considered together with the chassis and the central cylinder will together form a parallelogram shape 42 on each side of the central cylinder. As opposed to a design having only two sets of arms, the further set of nested arms provides that the two trailers will have a stable parallel relationship to each other. The action of the hydraulic cylinder acts to keep a desired distance between the trailer chassis and further dimensional stability can be provided with chain or cable 60 that fixes an outward distance between the pivot bracket of arm 26a and central hinge 36 once a desired distance between the trailer chassis is obtained.

Figure 2C:
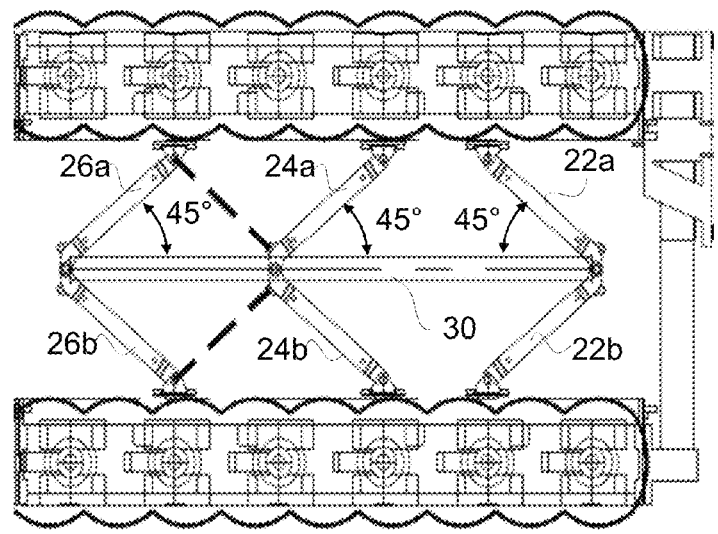
FIG. 2C illustrates the angles formed by the hinged arms of the embodiments of FIGS. 2A and B relative to a central hydraulic cylinder.

FIG. 2B also shows a flexible hydraulic line track 44 that extends or retracts depending on the distance between the trailers. In the embodiment depicted in FIGS. 2B and C, the hinged arms of motive widening assembly (arm set 22a, b) oppose the arms of the next adjacent passive widening assembly (arm set 24a, b) to form a generally diamond shaped space between them. Thus, while one arm of set 22 will be at an angle X to central cylinder 30, the respective opposing arm of set 24 will be at the same angle inverted to the central cylinder (360°–X in a full 360° plan). The system of the embodiment depicted in FIG. 2C includes 3 pivoting widening assemblies each comprising a pair of articulated arms (arm sets), a sliding lead widening assembly including sliding arms 22a and 22b, a middle widening assembly including passive arms 24a and 24b and a tail widening assembly including passive arms 26a and 26b. The lead widening assembly and the middle widening assembly oppose each other forming a diamond shape between then, while the tail widening assembly is nested behind the middle widening assembly with its arms in a parallel relationship to the arms of the middle widening assembly. The lead widening assembly arms 22a and 22b of the diamond shaped group of two widening assemblies are motive arms affixed in the central hinge to an outer aspect of a piston rod 38. The arms of the following middle widening assembly are affixed to the hydraulic cylinder housing from which the piston rod extends so the shape of narrow or wide diamond is formed by the inner and outward movement of the piston rod. As the piston rod is pushed out hydraulically, the arms of the lead widening assembly pivot backwards from the arms of the following middle widening assembly. The middle arm set 24a, b and the tail arm set 26a, b are affixed to the central cylinder 30 and will always pivot at the same angle thus forming parallelograms shapes on each side of the central cylinder. Whether the motive lead arms are extended or collapsed, the tail arm set will keep the trailer chassis in a parallel relationship.

Figure 2D:
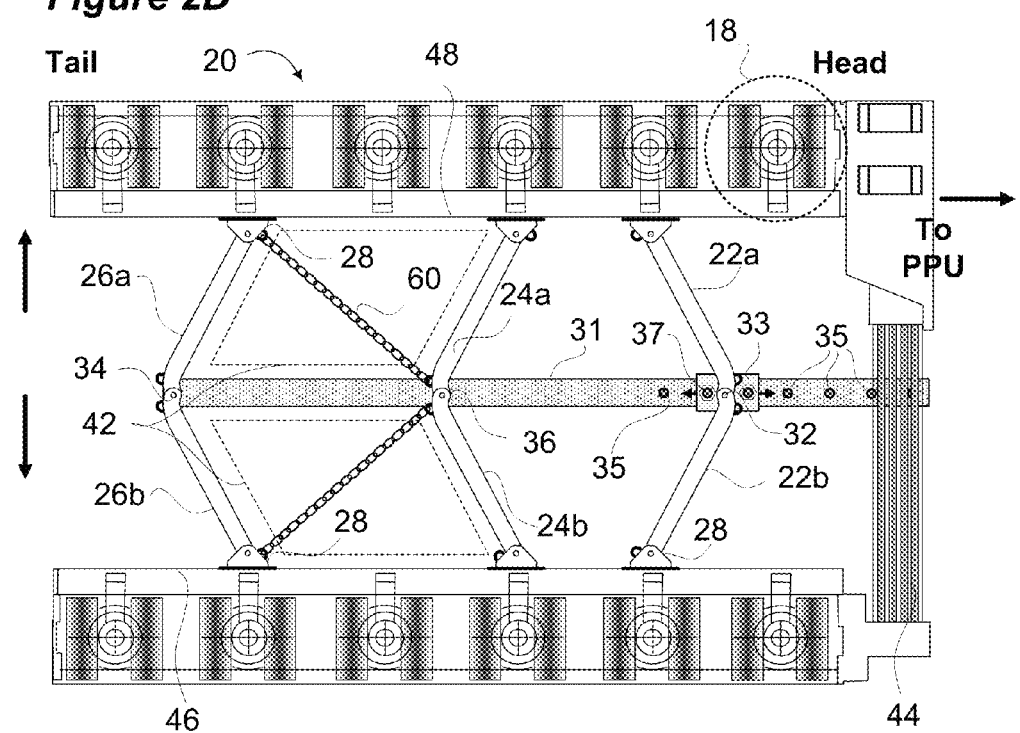
FIG. 2D depicts an embodiment wherein the motive widening assembly includes a sliding ring over a central aligner.

FIG. 2D depicts an embodiment of a split variable extension width SPMT vehicle having a pair of matching longitudinal chassis 48, each chassis including a deck supported by a plurality of independently swiveling wheel pair assemblies 18. In this embodiment, a set of at least three widening assemblies are provided, wherein each of the widening assemblies comprises a pair of hinged opposing folding arms (26a and 26b, 24a and 24b, and 22a and 22b), each of the pair of folding arms pivotably connecting the two matching longitudinal chassis through a center hinge (34, 36 and 32 respectively) that is affixed to a central aligner 31 that runs longitudinally between, and equidistant from, each of the longitudinal chassis, wherein at least two of the widening assemblies operate as a passive pair (26a, 26b and 24a, 24b in the example shown), having arms that move in the same direction and central hinges that are affixed in a set location relative to each other on the central aligner 31, and wherein the third widening assembly is a sliding assembly having widening arms 22a and 22b that move in an opposite direction to the passive pair and having its center hinge 32 affixed to runner 33 that is movable along the central aligner such that movement of the two longitudinal chassis away or toward each other moves the hinge of the sliding widening assembly relative to the fixed positions of the central hinges of the passive pair and assists in stable widening or narrowing of a distance between the longitudinal chassis. In certain embodiments runner 33 is a circumferential member such as a ring if the central aligner is tubular or may have a square or rectangular configuration if the central aligner is an angular beam. In other embodiments, the runner moves in a track in the central aligner. When a desired width between the two chassis is reached, the position of runner 33 is fixed. In one embodiment the position of runner 33 is fixed by pins or bolts 37 that pass through the runner and the central aligner such as with holes 35 through the central aligner. In embodiments such as this without a central hydraulic cylinder, if the wheel assemblies are not able to fully expand or retract the folding arms, the chassis can be pushed together or pulled apart by any number of devices including, without limitation, tractors, come-alongs or portable hydraulics.

Figure 3A:
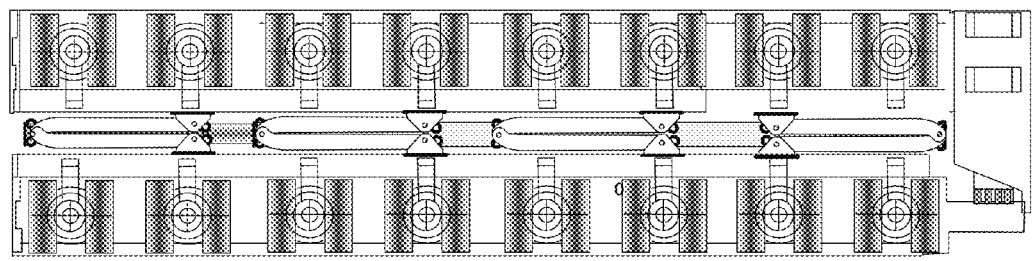
FIGS. 3A and 3B depict an alternative embodiment having 4 hinged widening assemblies.
Figure 3B:
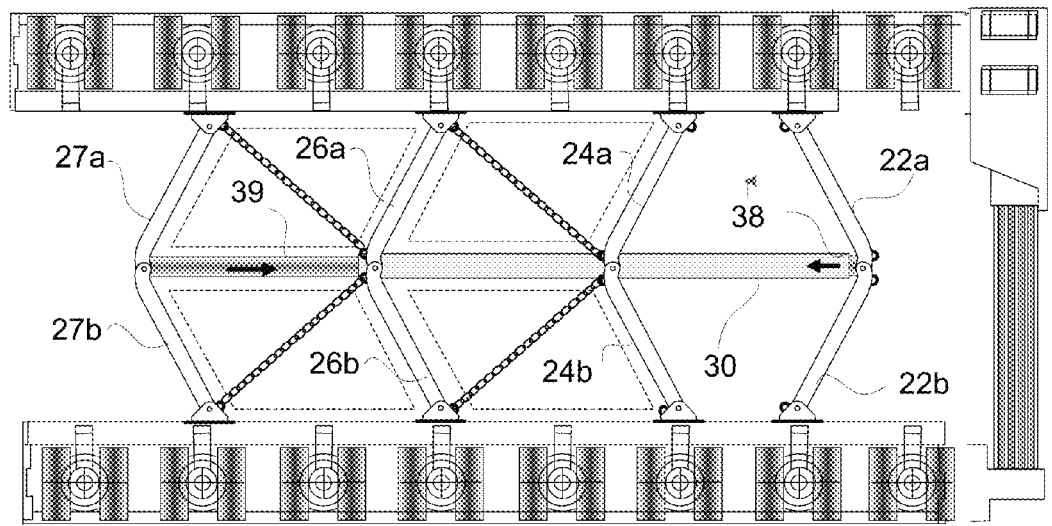

FIGS. 3A and B depict an alternative embodiment with four sets of arms, the last three of which are nested and fold in the same direction forming matching parallelograms between them on each side of the central hydraulic cylinder (as shown with the doted line), while the first arm set folds in an opposite direction thus forming a diamond shape respective to the first of the nesting set of arms. The final three arm sets may be passive. Alternatively, in embodiment such as is depicted in FIG. 3B a double hydraulic cylinder maybe utilized with two piston rods 38 and 39 moving in opposite directions into and out of central housing 30. As shown in FIG. 3B, the hinged arms of sliding arm set 22a, b oppose the arms of passive arm set 24a, b to form a generally diamond shaped space between them. The system of the embodiment depicted in FIG. 3B includes 4 pivoting sets of arms, a sliding lead set including sliding arms 22a and 22b, a middle set including passive arms 24a and 24b and a two tail sets including passive arms 26a and 26b and either motive or passive arms 27a and 27b. The lead set and the following middle set oppose each other forming a diamond shape, while the tail sets are nested behind the middle set with their arms in a parallel relationship to the arms of the middle set. The lead arms of the diamond shaped group of two arm sets are motive arms affixed in the middle hinge to an outer aspect of piston rod 38. The following middle arms of the diamond shaped pair are affixed to the hydraulic cylinder housing 30 from which the piston rod extends so the shape of the diamond is formed by the inner and outward movement of the piston rod. As the piston rod is pushed out hydraulically, the lead arms pivot backwards from the following middle arms. The middle arm set 24a, b and the tail arm sets 26a, b and 27a,b will always pivot at the same angle thus forming parallelogram shapes shown in the dashed lines. Whether the motive lead arms are extended or collapsed, the tail arm sets will keep the two trailer chassis in a parallel relationship.

Figure 4:
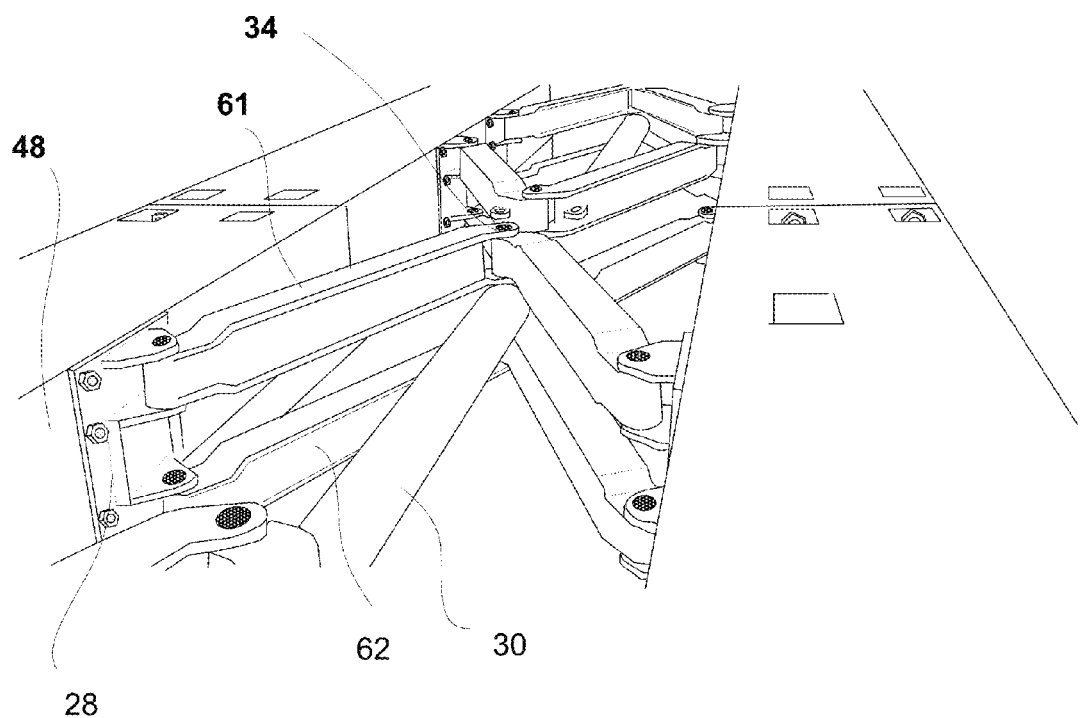
FIG. 4 illustrates an oblique end on view of one embodiment showing the relative attachment positions of the hinged arms to the trailer chassis and a central aligner or hydraulic cylinder.

FIG. 4 depicts a partial oblique end on view of one embodiment of a mechanism of fixation of the hinged arms of the widening assemblies to the central cylinder, rod or beam 30. Each arm is actually a pair of arms, a top arm 61 centrally affixed on top of the central cylinder, rod or beam 30 by a hinge 34, and a matching bottom arm 62 centrally affixed on a bottom of the central cylinder, rod or beam 30 by a hinge (not shown). Each of the top and bottom arms of the passive arms are affixed to the central cylinder, while the top and bottom arms of the motive arms are affixed to the distal end of the piston rod or sliding runner (not shown). Each set of top and bottom arms are attached to the inner side of the chassis 48 by pivot bracket 28.

Figure 5:
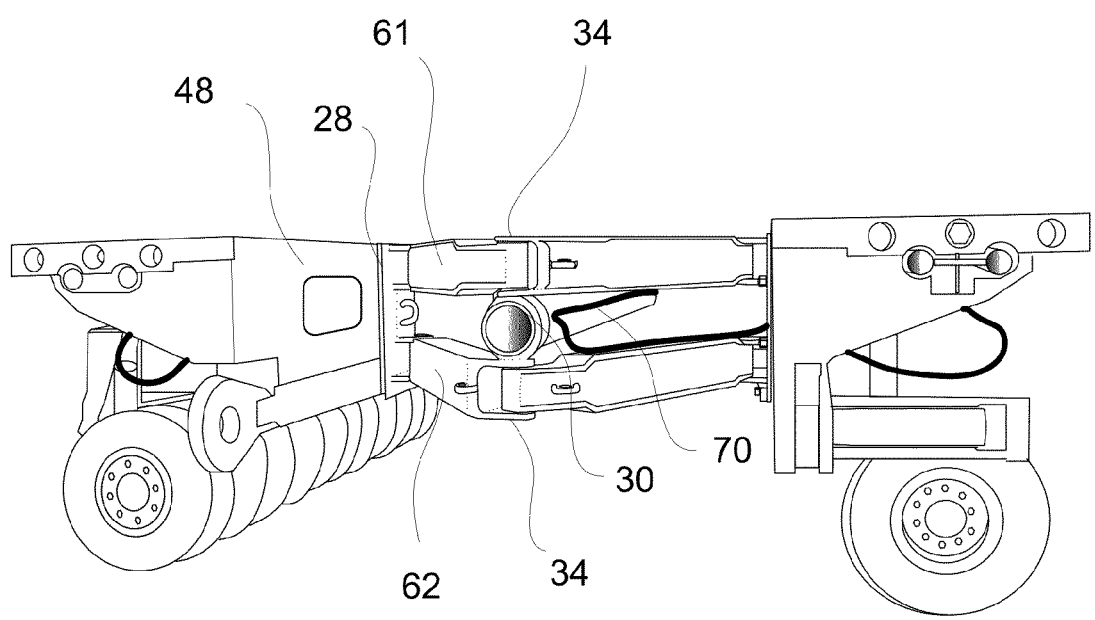
FIG. 5 illustrates another oblique end on view of one embodiment showing the relative attachment positions of the hinged arms of the widening assemblies to the trailer chassis and a central aligner or hydraulic cylinder.

FIG. 5 depicts another partial oblique end on view of hinged arms 61 and 62 affixed via a pinned hinge 34 to the top and bottom of central hydraulic cylinder housing 30. Hydraulic lines 70 provide motive force to the hydraulic cylinder. Hinged arms 61 and 62 are affixed to chassis 48 via pivot bracket 28.

Figure 6A:
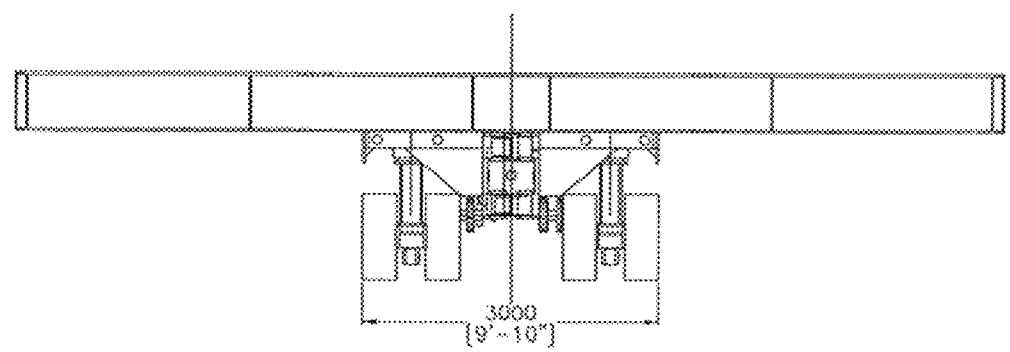
FIGS. 6A-C show end on views of an embodiment of a split SPMT in collapsed (FIG. 6A), partially extended (FIG. 6B) and fully extended positions (FIG. 6C).
Figure 6B:
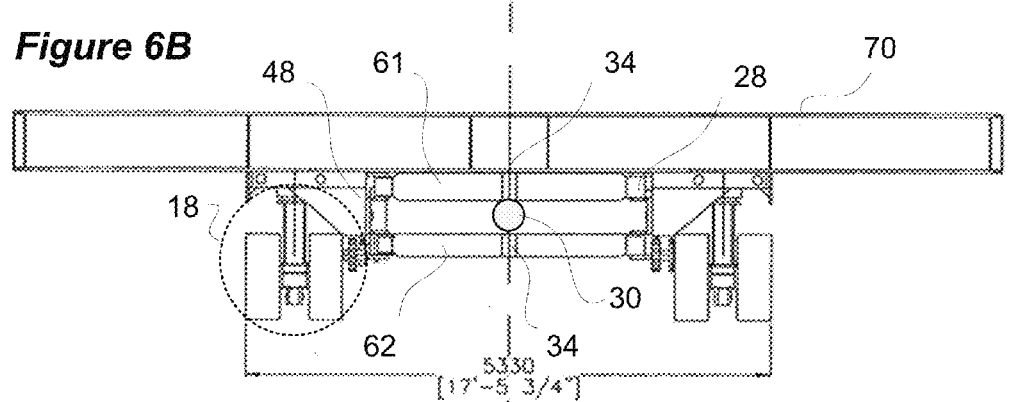
Figure 6C:
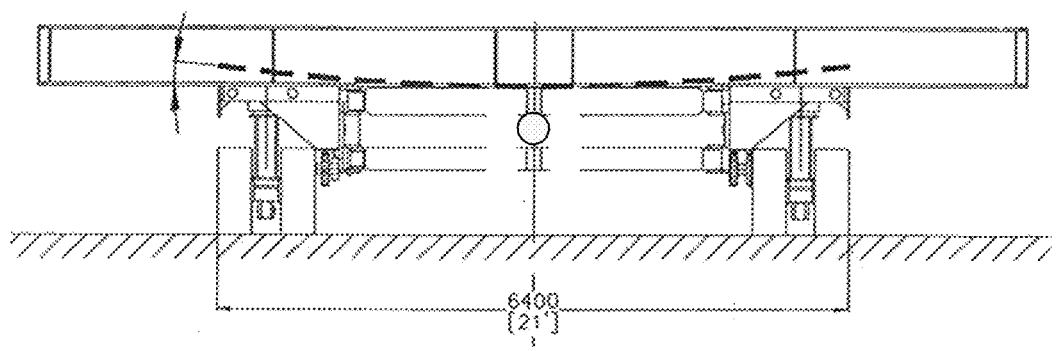

FIGS. 6A, B and C depict end on views of an embodiment of the invention and show the widths of the outer aspects of wheel assemblies. FIG. 6B depicts an end on view of hinged arms 61 and 62 affixed via a pinned hinge 34 to the top and bottom of central hydraulic cylinder housing 30. Hinged arms 61 and 62 are affixed to chassis 48 via pivot bracket 28. Load deck 70 stretches across the two single axle trailers. As shown in the embodiment depicted in FIG. 6A, the width to the outer aspect of the wheel assemblies when the hinged arms are completely folded on the central cylinder would be about 9 ft., 10 inches. When in one partially extended example as shown in FIG. 6B, the width to the outer aspect of wheel assemblies 18 would be 17 feet 5¾ inches. When fully extended as shown in FIG. 6C, the width to the outer aspect of the wheel assemblies would be 21 feet. Thus, the trailer wheel assemblies can be placed at any width between about 9 ft., 10 inches and 21 ft permitting a desired accommodation not only to the load requirement but also to available roads on which the trailers must move.

Figure 7:
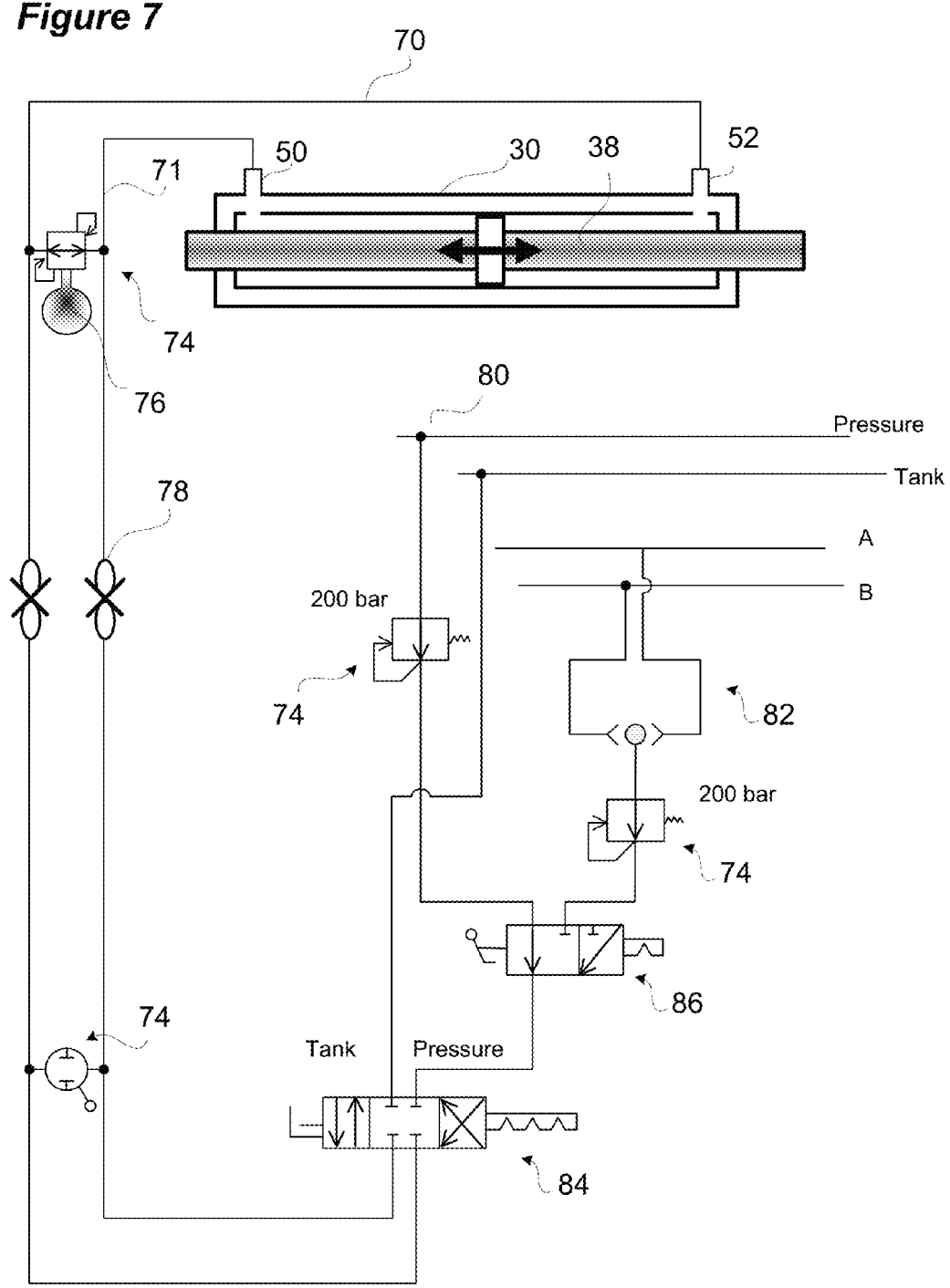
FIG. 7 represents an embodiment of a hydraulic system schematic for operating a motive force piston rod to expand or collapse a split SPMT.

FIG. 7 shows one embodiment of a hydraulic system for providing the motive force to extend or collapse the arms of a hinged arm split trailer SPMT. Piston rod 38 moves back and forth within hydraulic cylinder housing 30 as hydraulic fluid is pumped in or out of the two sides of the cylinder via ports 50 and 52. Hydraulic lines 70 and 71 are connected via a plurality of pressure relieve valve systems 74, which may include an accumulator 76 that provides safety compensation for temperature changes that may affect the volume of the hydraulic fluids. Hydraulic lines are preferably provided with quick connects 78. Preferably, quick connects are used to connect the hydraulic hoses of the frame to hydraulic valves built into the wheel assemblies.

In one embodiment, the hydraulic pressure of the wheel assembly drive system is activated to push out or pull in the piston rod of the central hydraulic cylinder at the same time as the axles are pressurized to drive the trailers open or closed. In other embodiments, the drive system is not used and the hydraulic pressure of the steering system is used to open and closed the trailer using steering pressure.

Figure 8A:
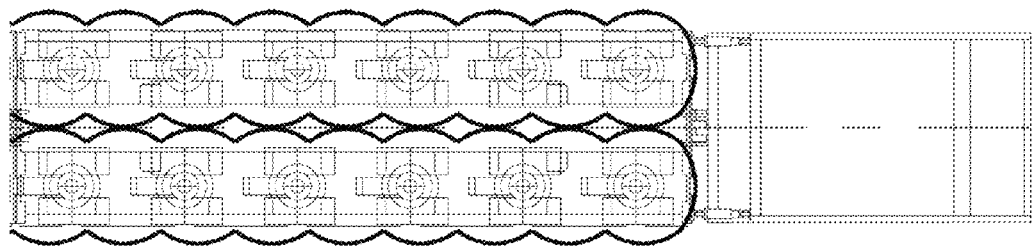
FIG. 8A shows a prior art single module SPMT relative to a split SPMT according to an embodiment of the invention depicted in FIG. 8B.
Figure 8B:
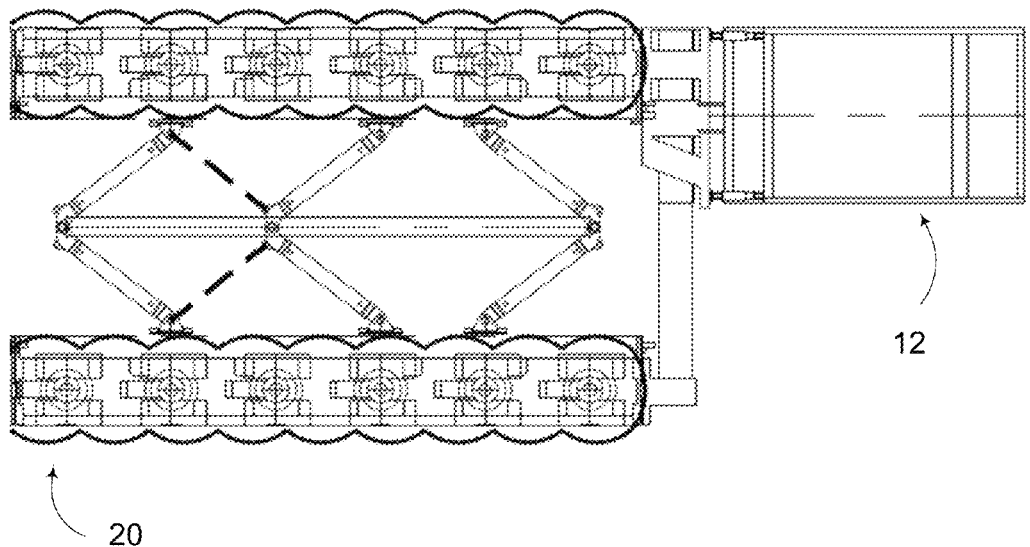

FIG. 8A depicts the width of a prior art SPMT having two longitudinal lines of single axle wheel assemblies that would be affixed to a single top deck (not shown). In contrast, FIG. 8B depicts the width obtainable through a widthwise extension of an embodiment including one PPU 12 and two single axle trailers 20 that are split by at least three hinged hydraulically operated arms.

Figure 9A:
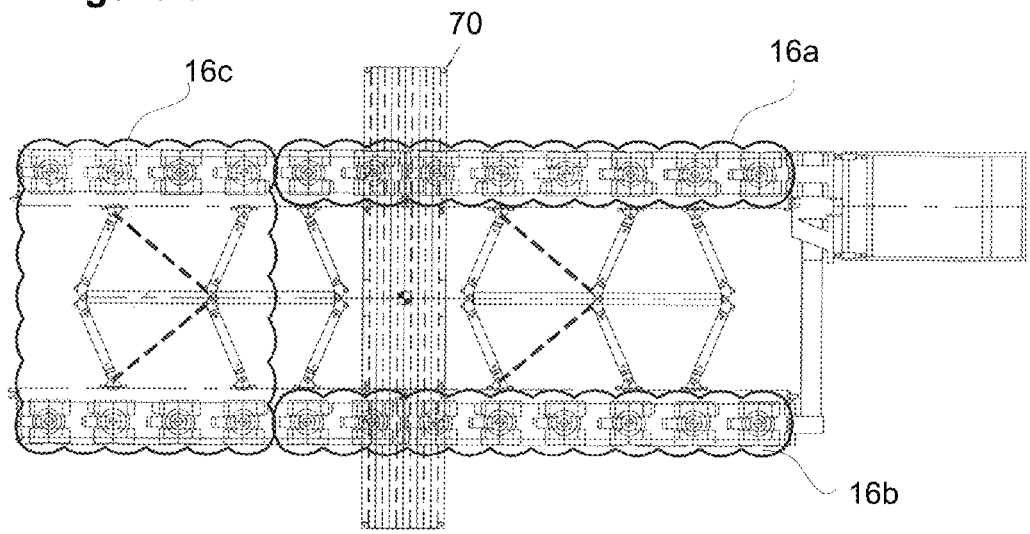
FIG. 9A shows the end to end connection of two split SPMTs thus providing a 24 axle split SPMT. The circled elements represent a shared hydraulic.
Figure 9B:
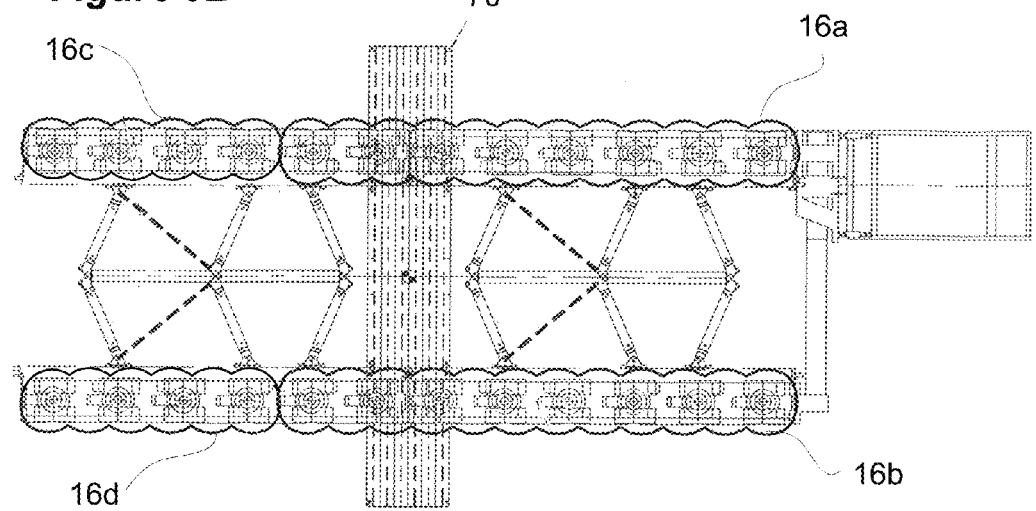
FIG. 9B depicts an embodiment having four hydraulic systems and what could be termed a four hydraulic suspension.
Figure 9C:
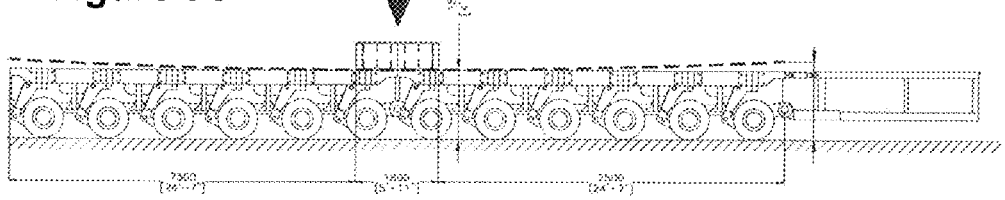
FIG. 9C provides a side view of the embodiments of FIGS. 9A and B.

FIG. 9A depicts an embodiment that combines 2 modules, each of which includes two single axle 6 wheel assembly trailers 20 that are each split by at least three hinged hydraulically operated arms. The looped circles show that three hydraulic groups (16a, 16b and 16c) are utilized, however, this grouping is flexible and can also be changed to match each special loading condition put onto the trailer. FIG. 9B depicts an embodiment having four hydraulic systems (16a, 16b, 16c and 16d) and would be termed a four hydraulic suspension system. FIG. 9C provides a side view of FIGS. 9A and 9B.

FIG. 10A depicts the width of a prior art SPMT having two longitudinal lines of single axle wheel assemblies that combines 4 modules end to end. As shown in FIG. 10B, in this example the combined width to the outside of the wheels is 7 feet, 11¾ inches. The advantage of the split version is shown by comparing FIGS. 10B and 10D. By an assumed same stability angle of 7.2 degrees and same weight of cargo, the maximum height of the COG of the load that can safely be transported without causing the trailer to capsize is 9 feet above the deck of the trailer shown in FIG. 10B. In contrast, when using the split SPMT shown in FIG. 10C, showing 4 modular sets of split SPMT, with a width to the outside of the wheels of 17 feet, 5¾ inches, FIG. 10D shows that the maximum height of the COG above the trailer deck is ~27 feet with an even better stability angle of 8.8°. Using 4 points will increase the stability angle even more.

The invention claimed is:

1. A split variable extension width self-propelled motorized transporter (SPMT) vehicle comprising:
   a pair of matching longitudinal chassis, each chassis including a deck supported by a plurality of wheel pair assemblies;
   at least three widening assemblies mounted between the two chassis, wherein each of the widening assemblies comprises a pair of hinged opposing folding arms, each of the pair of folding arms pivotably connecting the two matching longitudinal chassis through a center hinge that is affixed to a central aligner that runs longitudinally between, and equidistant from, each of the longitudinal chassis, wherein at least two of the widening assemblies operate as a passive pair, having arms that move in the same direction and central hinges that are affixed in a set location on the central aligner, and wherein the third widening assembly is a sliding assembly having widening arms that move in an opposite direction to the passive pair thus forming a generally diamond shaped space between the widening arms of the sliding assembly and the passive pair and having its center hinge affixed in a slidable position on the central aligner such that movement of the two longitudinal chassis toward or away from each other moves the hinge of the sliding widening assembly relative to the fixed positions of the central hinges of the passive pair and assists in stable widening or narrowing of a distance between the longitudinal chassis.

2. The split variable extension width SPMT vehicle of claim 1, wherein the center hinge of the sliding assembly is affixed on a runner that slides along the central aligner.

3. The split variable extension width SPMT vehicle of claim 2, wherein a position of the runner on the central aligner can be set by a pin or bolt that locks the runner in a fixed location on the central aligner.

4. The split variable extension width SPMT vehicle of claim 2, wherein the central aligner is a tube.

5. The split variable extension width SPMT vehicle of claim 2, wherein the central aligner is a rod.

6. The split variable extension width SPMT vehicle of claim 2, wherein the central aligner is a beam.

7. The split variable extension width SPMT vehicle of claim 1, wherein the central aligner is a hydraulic cylinder and the center hinges of the passive pair of widening assemblies are affixed in a set location to a housing of the hydraulic cylinder and the center hinge of the sliding assembly is affixed to a piston rod of the hydraulic cylinder such that movement of the piston rod moves the hinge of the sliding widening assembly relative to the fixed positions of the central hinges of the passive pair.

8. The split variable extension width SPMT vehicle of claim 1 further comprising stabilizing lines affixable between passive arm chassis connections of at least one widening assembly and a central hinge of an adjacent widening assembly.

9. The split variable extension width SPMT vehicle of claim 1, further comprising a fourth passive widening assembly.

10. The split variable extension width SPMT vehicle of claim 7, further comprising a dual hydraulic cylinder having a first and second piston, the first and second pistons adapted to move in opposite directions relative to each other and a fourth sliding widening assembly positioned behind the pair of passive widening assemblies and having a central hinge affixed to the second piston and its widening arms moving in the same direction as the arms of the passive pair.

11. The split variable extension width SPMT vehicle of claim 1, wherein each of the pairs of hinged opposing folding arms comprises a set of two hinged top arm pairs and two hinged bottom arm pairs pivotably attached to and sandwiching the central aligner.

12. The split variable extension width SPMT vehicle of claim 1, wherein the central aligner is a hydraulic cylinder that is powered by a Power Pack Unit (PPU) that also provides hydraulic power to the wheel assemblies.

13. A split variable extension width self-propelled motorized transporter (SPMT) vehicle comprising:
   a pair of matching longitudinal chassis, each chassis including a deck supported by a plurality of wheel pair assemblies;
   at least three widening assemblies mounted between the two chassis, wherein each of the widening assemblies comprises a pair of hinged opposing folding arms, each of the pair of folding arms pivotably connecting the two matching longitudinal chassis through a center hinge that is affixed to a central aligner that runs longitudinally between, and equidistant from, each of the longitudinal chassis, and
   stabilizing lines affixable between passive arm chassis connections of at least one widening assembly and a central hinge of an adjacent widening assembly, the stabilizing lines adapted and dimensioned to fix an outward distance between the matching longitudinal chassis.

14. The split variable extension width SPMT vehicle of claim 13, wherein each of the pairs of hinged opposing folding arms comprises a set of two hinged top arm pairs and two hinged bottom arm pairs pivotably attached to and sandwiching the central aligner.

15. The split variable extension width SPMT vehicle of claim 13, wherein the central aligner is a hydraulic cylinder that provides a motive force to open and close at least one pair of hinged opposing folding arms.

16. A split variable extension width self-propelled motorized transporter (SPMT) vehicle comprising:
- a pair of matching longitudinal chassis, each chassis including a deck supported by a plurality of wheel pair assemblies;
- at least four widening assemblies mounted between the two chassis, wherein each of the widening assemblies comprises a pair of hinged opposing folding arms, each of the pair of folding arms pivotably connecting the two matching longitudinal chassis through a center hinge that is affixed to a central aligner that runs longitudinally between, and equidistant from, each of the longitudinal chassis, and
- stabilizing lines affixable between passive arm chassis connections of at least one widening assembly and a central hinge of an adjacent widening assembly, the stabilizing lines adapted and dimensioned to fix an outward distance between the matching longitudinal chassis.

17. The split variable extension width SPMT vehicle of claim 16, wherein each of the pairs of hinged opposing folding arms comprises a set of two hinged top arm pairs and two hinged bottom arm pairs pivotably attached to and sandwiching the central aligner.

18. The split variable extension width SPMT vehicle of claim 16, wherein the central aligner is a hydraulic cylinder that provides a motive force to open and close at least one pair of hinged opposing folding arms.

* * * * *